United States Patent
Bourne et al.

(10) Patent No.: US 7,197,568 B2
(45) Date of Patent: Mar. 27, 2007

(54) SECURE CACHE OF WEB SESSION INFORMATION USING WEB BROWSER COOKIES

(75) Inventors: Donald A. Bourne, Toronto (CA); Victor Chan, Thornhill (CA); Darshanand Khusial, Mississauga (CA); Mark H. Linehan, Yorktown Heights, NY (US); Lev Mirlas, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/321,411

(22) Filed: Dec. 17, 2002

(65) Prior Publication Data

US 2004/0117486 A1 Jun. 17, 2004

(30) Foreign Application Priority Data

Mar. 27, 2002 (CA) .................................. 2379082

(51) Int. Cl.
*H04L 9/00* (2006.01)
(52) U.S. Cl. ...................... 709/229; 713/180; 713/176; 726/4; 726/9
(58) Field of Classification Search ................ 709/225, 709/228, 229, 203; 713/185, 168, 176, 180; 726/9, 3, 4
See application file for complete search history.

(56) References Cited

U.S. PATENT DOCUMENTS 6,754,825 B1 * 6/2004 Lennie et al. ............... 713/181
6,836,845 B1 * 12/2004 Lennie et al. ............... 713/181
6,948,074 B1 * 9/2005 Borella et al. ................ 726/14
7,137,009 B1 * 11/2006 Gordon et al. .............. 713/185
2003/0191812 A1 * 10/2003 Agarwalla et al. .......... 709/217
2005/0154887 A1 * 7/2005 Birk et al. ................... 713/168

OTHER PUBLICATIONS

P.C. Cheng; An Architecture for the Internet Key Exchange Protocol; IBM Systems Journal, vol. 40, No. 3; accepted for publication Mar. 30, 2001.*
Rolf Oppliger; Protecting Key Exchange and Management Protocols Against Resource Clogging Attacks; Sep. 21, 1999.*

* cited by examiner

Primary Examiner—Kenneth R. Coulter
(74) Attorney, Agent, or Firm—Hoffman Warnick & D'Alessandro, LLC; Jerry W. Herndon

(57) ABSTRACT

A secure method and system for accessing a cache for web session is provided using web browser cookies. The cache for the web session data uses an encoded identifier, determined using for example the Keyed-Hash Message Authentication Code, based on information identifying a client. The client communication is accompanied by a cookie (persistent state object) that also includes the identifier encoded in the same manner. This encoded identifier in the received cookie is used for accessing the cached data. Where a secure communication channel is available, such as a secure socket layer (SSL connection), a second cookie which is only transmitted over SSL is used as a signature for the first cookie.

10 Claims, 1 Drawing Sheet

SECURE CACHE OF WEB SESSION INFORMATION USING WEB BROWSER COOKIES

FIELD OF THE INVENTION

The present invention relates generally to caching data for a user's Internet session, and more specifically to increasing security of the cached data.

BACKGROUND OF THE INVENTION

In web-based systems, such as electronic commerce systems, when data is requested by a client from a server, it is often the case that the web server must query a database to locate the requested data. This database access requires time and use of system resources. To speed up future requests, frequently accessed pieces of data are typically stored ("cached") in memory or in a more easily accessible area so that a later request can be serviced more quickly, without repeatedly querying the database. The data is stored in a cache, together with an index or "cache key", which is used to identify each piece of cached data. Searching for data using the cache key is a faster process than retrieving the same data from a database a second time.

In electronic commerce, communications between a server and a web browser client typically require authorization of the client, to permit a client access only to certain data stored by the server. Such data may include contract information or pricing information which is exclusive to that client; other clients of the web server are not entitled to view this information.

One approach to identifying the client to the server is to initially authenticate the client and to then provide a session identifier to the client in the form of a hypertext transfer protocol (HTTP) cookie. A cookie, which is a form of persistent state object, is a small piece of data generated by the server and which is intended to be passed by the client with every subsequent client request to any server in a defined domain. Upon receipt of the request, the server can verify the client's entitlement to the requested information by comparing the contents of the cookie to the client records stored on the server. Such an approach is disclosed, for example, in U.S. Pat. No. 5,875,296 to Shi et al. (Feb. 23, 1999) in which a cookie including a client identifier is used to access an in-memory credential database used to allow or disallow access to files on a distributed file system.

Data and cookies that are transmitted between servers and clients on the Internet are subject to certain security risks unless measures are taken to secure communications between the client and server. An unauthorized user at a routing point or at another server in a cookie's domain may capture the packets transmitted between the client and the server and read the data contained in the transmitted cookie. Alternatively, a user may edit the contents of his or her own authorized cookie and alter the session data contained therein to construct a fraudulent session. For example, if the session data includes a contract identification number, the user could edit the cookie to insert a different number and thereby gain access to unauthorized data or resources when the edited cookie is transmitted to the server in a subsequent request. An unauthorized user may furthermore "steal" a valid cookie from an authorized user, and use the cookie to replay a valid session, thereby gaining unauthorized access to the server (a "replay attack").

A cookie that includes information about authorizations provided to a client, as described above, that is submitted with a client request for cached data is potentially subject to unauthorized alteration or access. The cached data is therefore potentially vulnerable to unauthorized access. Such security risks are referred to in U.S. Patent Application 2002/0007402 to Huston et al. (published Jan. 17, 2002). The Huston application describes a list of users that is maintained to ensure that requests for cached data are authorized. The list is checked prior to accessing the cached data. Redundant requests from a single client are also ignored to prevent replay attacks.

However, when data is cached by a server system, the data cache itself does not carry out an authentication function. If a valid cache key is provided to the data cache, the data cache will supply the data indexed by the cache key. The approaches referred to above, that require a look up of authorization information on the server before granting cache access, include a further client authentication step that delays access to the cached data.

It is therefore desirable to provide a cache for web session information that provides authorized secure access to the cached data but that does not require a further look up of authorization information maintained by the server prior to accessing the cache.

SUMMARY OF THE INVENTION

According to one aspect of the invention there is provided an improved system and method for securely caching web session information using web browser cookies.

According to another aspect of the invention there is provided a secure cache that utilizes hashed cookie values to preclude unauthorized tampering with cookies containing client authorization information. According to another aspect of the invention, there is provided a pair of cookies, the second of the pair only being communicated if transmission utilizes a secure socket layer, to act as a secure signature for the first cookie.

According to another aspect of the invention there is provided a computer-implemented method for a web-based system to provide data to a client from a data cache, the system comprising a server, the method comprising the following steps:

the server generating a cookie comprising an encoded client identifier for the client, the encoded client identifier being generated using the HMAC (Keyed-Hash Message Authentication Code) protocol, the server delivering the cookie to the client;

storing the data in the data cache in association with a cache key, the cache key for the data being generated in a manner dependent on the encoded client identifier, the data cache receiving a request including a copy of the cookie from the client; and the data cache retrieving the data from the data cache using the encoded client identifier provided in the copy of the cookie in the request, the data cache delivering said data to the client.

According to another aspect of the invention there is provided a computer-implemented method for a web-based system to provide data to a client from a data cache, the system comprising a server, the method comprising the following steps:

a) the server generating a first state object comprising an encoded client identifier for the client, b) the server generating a second state object comprising a concatenation of a unique value and an encoded value derived from both the unique value and the encoded client identifier;

c) the server delivering the first state object to the client;
d) the server delivering the second state object to the client using a secure connection;
e) storing the data in the data cache in association with a cache key, the cache key for the data being generated in a manner dependent on the encoded client identifier;
f) the server receiving a request from the client over a secure channel, the request including a copy of the first state object and a copy of the second state object;
g) verifying the validity of the first state object by extracting the unique value and the encoded value from the received copy of the second state object, encoding said unique value from the received copy of the second state object with the encoded identifier from the received copy of the first state object to produce a result, and comparing said result with the encoded value to verify the received copy of the first state object; and
h) in the case that the validity of the first state object is verified, retrieving the data in the data cache using the encoded client identifier, and delivering the data to the authorized client.

According to another aspect of the invention there is provided the above method which the unique value is a nonce including one of a monotonically varying set of data values.

According to another aspect of the invention there is provided the above method in which the state object is a cookie, the secure connection is an SSL connection and the encoded client identifier includes a contract identifier and a parent organization identifier that is encoded using the HMAC protocol (described in more detail below).

According to another aspect of the invention there is provided a computer program product including a computer usable medium tangibly embodying computer readable program code means for implementation on a web server system, the computer readable program code means including code means for carrying out the steps of the above methods.

Advantages of the invention include cookies that cannot be easily altered to access data in a cache that a user is not provided access to. A further advantage is that where an SSL connection is established to a server having a cache, a pair of cookies may be used, the second cookie in the pair being available to act as a signature for the first cookie.

BRIEF DESCRIPTION OF THE DRAWINGS

In drawings which illustrate by way of example only a preferred embodiment of the invention.

DETAILED DESCRIPTION OF THE INVENTION

Figure 1:
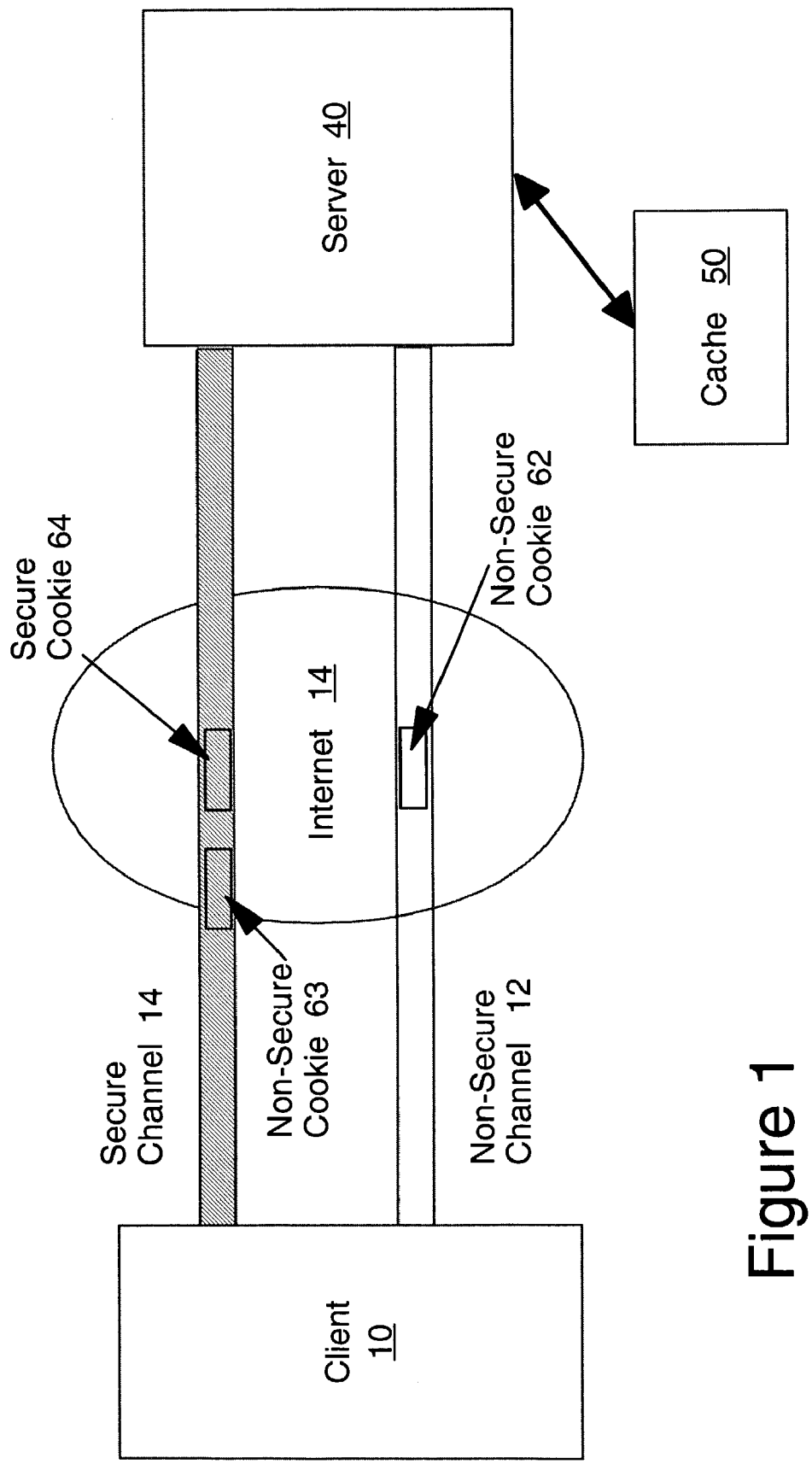
FIG. 1 is a block diagram of the relationship between the client, server, and cache of the preferred embodiment.

Referring to FIG. 1, the relationship between client 10, channels 12, 14, server 40, and cache 50 is shown. Communication between client 10 and server 40 is carried out using either one of communications channels 12, 14. The client 10 typically runs on a personal computer or other device managed by the user or customer and is typically a web browser. In the preferred embodiment, client 10 is connected to server 40 via the Internet using the known hypertext transfer protocol (HTTP) and transmission control protocol/Internet protocol (TCP/IP).

The server 40 is depicted notionally as a single entity in FIG. 1. In practice, the server 40 may be an enterprise server consisting of a number of networked machines which cooperate to handle requests from various clients (represented in FIG. 1 by client 10). Server 40 will receive such requests and will carry out (directly or by accessing other systems) the business logic necessary to respond to those requests.

In accordance with the applicable protocols, a connection is opened between the client 10 and the server 40 when a request for a resource located on the server 40 is made by the client 10; in order to service this request, the connection is maintained until the server 40 has responded to the request, typically by transmitting a document or other data to the client 10. After the response has been transmitted, the connection is closed.

In the example of FIG. 1, certain data that was accessed or generated by the server 40 in response to a request from the client 10 is stored in cache 50. The use of the cache will reduce response time for future requests made by the client 10, or by another client, for the same data. The cache may be located internally on the server 40, or externally. In the example illustrated in FIG. 1, cache 50 is shown as being external to server 40. However, cache 50 may be located within an enterprise server or it may be located at one of a number of routing points between the client 10 and the server 40. Cached data is stored together with a cache index or key which serves as an identifier of the cached data. The preferred embodiment is intended for use with a cache that is available to the client browser 10 such that the cache will provide data to the client browser where the data is present in the data cache and authorization criteria are met. As is described in more detail, below, the cache of the preferred embodiment is designed to require the presence of encoded cookies sent by the client web browser as part of its requests to reduce the opportunity for unauthorized access to cached data.

In the preferred embodiment, communication between the client 10 and the server 40 may take place over a non-secure or a secure channel (shown as channels 12, 14, respectively in FIG. 1). A secure channel or connection provides data privacy for the communication between the server and the client. A standard protocol for secure transmission over the Internet is HTTP over a secure socket layer (SSL). Communication carried out on an SSL channel such as channel 14 encrypts and decrypts data transmitted between the client 10 and the server 40. An SSL channel also provides for one-way authentication: the client having an SSL connection with a server is able to determine the identity of the server (due to the SSL protocol design). The preferred embodiment may use a non-secured connection or, alternatively, a secured connection. The use of cookies in accordance with the preferred embodiment for the two different communication alternatives is set out below.

The preferred embodiment uses a cookie-based approach to identifying requests from a particular user. A client browser 10 transmits a request using the HTTP protocol to the server 40. In handling the request, the server 40 determines whether the client 10 has been previously authenticated by the server 40 (a client is typically authenticated during a log in process).

If the request comes from a client 10 that has not been previously authenticated, then the server 40 will perform a verification procedure to determine which resources the client 10 is entitled to access. This verification procedure may follow known processes used to verify customers; for example, the user may be required to submit, via the client browser 10, a userid and password, or other identifying information, or undergo a challenge-response procedure. Once the user is authenticated, the server 40 creates and transmits a cookie to the client 10 for use in subsequent requests, as referred to above.

According to the preferred embodiment, the cookie values provided to client 10 are encoded and such encoded cookie values are used to generate cache keys for the data cache. Thus an authenticated client 10 will provide an encoded cookie (or cookies) as part of subsequent requests for data that are able to be satisfied by cached data. The use of the encoded cookie values to generate keys for the cache provides security for the cached data, as described below.

According to the preferred embodiment, the security level of the channel used for communication between the server 40 and the client 10 will determine whether a single non-secure cookie or two cookies, one secure and one non-secure are used for cache access. Cookies may be selectively defined by the server that generates them to be secure or non-secure. When a server defines a cookie to be secure, clients are constrained to pass the cookie on secure connections (SSL connections) only. Non-secure cookies may be included in client requests sent over either non-secure or secure channels.

Thus where a request from client 10 to server 40 is made over non-secure channel 12, a non-secure cache cookie 62 is generated and provided by server 40 to client 10. According to the preferred embodiment, server 40 defines non-secure cache cookie 62 to include encoded data generated by server 40 using a one-way hashing technique. The encoded cookie value is based on client identifier information that may have been input by the user as part of the verification procedure, or may be retrieved by the server 40 from client records during the verification process.

In one embodiment, the information used to form the encoded value of non-secure cookie 62 comprises at least one contract identifier and a parent organization identifier, which serves to identify the user as a member of a business which is registered with the server 40 under specific contracts. In the preferred embodiment, this information (client identifier) is encoded using the Keyed-Hash Message Authentication Code (HMAC) hashing protocol (the HMAC protocol is set out in RFC 2104 published by the Internet Engineering Task Force). The HMAC protocol uses one-way hash functions and an encryption key. This hashed information, based on the client identifier, is used to generate the value stored in the non-secure cache cookie 62. Because the cookie value has been encoded using the HMAC protocol, the client identifier determined by server 40 is concealed from client 10 (the authorized user), as well as from unauthorized users who may improperly obtain the cookie.

According to the preferred embodiment, this hashed value is used in the cache to generate the cache key. The hashed value is necessary to allow client 10 to access data stored in cache 50. For each subsequent request in the session, the client 10 will transmit the request to the server 40 together with the non-secure cache cookie 62. If the response to the request consists of data that was not previously cached, then the server 40 will look up and transmit the data in a normal fashion. This data is then potentially cached in the external cache 50. The hashed data comprising the value of the non-secure cache cookie 62 is used to formulate the cache key for the data to be stored in the data cache.

Because the request includes both a universal resource locator (URL) that identifies the resource that is the subject of the request, as well as the value of the non-secure cache cookie 62, the cache 50 is able to determine whether the required data is cached and can retrieve the data, using the hashed cookie value to generate the cache key. Different techniques known to those skilled in the art may be used to calculate a cache key using, amongst other possible inputs, the value of the non-secure cache cookie 62. The approach used uniquely identifies the cached data and will rely on the value of the hashed client identifier found in the cookie.

If a request to the cache 50 does not include a valid non-secure cache cookie 62, the cache 50 will ignore the request and the server 40 will generate the response instead. The server 40 will generate and deliver a valid non-secure cache cookie 62 to the client 10 as part of the response.

Thus, over a non-secure connection 12, the use of the HMAC protocol hashed cookie value to generate the cache key limits forgery of the contract or parent organization identifiers (the cache keys). Due to the number of characters in the cookie 62 and their randomness, users are not able to guess other values that would represent values of other cache keys already stored in the cache.

In a secure (SSL) connection, a session between the client 10 and the server 40 is initiated using a similar method to the non-secure channel communication. The preferred embodiment provides that for a secure connection both a non-secure cache cookie 63 and a second, secure cache cookie 64, are delivered to the client 10 over secure channel 14. Non-secure cache cookie 63 is defined by server 40 in the same manner as is non-secure cache cookie 62. Secure cache cookie 64 is defined by server 40 to require client 10 to transmit the cookie over a secure channel, only.

Secure cache cookie has a value defined by server 40 that is used to verify the non-secure cookie 63 value. The secure cache cookie 64 consists of a concatenation of a unique value, and the same unique value hashed (using the HMAC protocol) with the value of the non-secure cache cookie 63.

Preferably, the unique value is a nonce, for example a timestamp from a monotonically increasing clock. Effectively, the value of the secure cache cookie 64 is a signature or derivation of the non-secure cache cookie 63. The nonce introduces a perturbation to the non-secure cache cookie value to avoid inadvertent reuse of the same value which would make decoding the hashed value easier.

When a request including both the secure cookie 64 and non-secure cookie 63 is transmitted by the client 10 and received by the cache 50, the cache 50 uses the secure cookie 64 to check the validity of the non-secure cookie 63. The unique and hashed values are taken from the value of the secure cookie 64; the unique value is combined with the value of the non-secure cookie 63 and hashed (using the same HMAC protocol hashing function), then the resultant value is compared to the value of the hashed string stripped from the secure cookie 64. If these values match, then the cache 50 is able to determine that the non-secure cache cookie 63 is valid, and its value may be used as a cache key to retrieve cached data to be served to the client 10.

As will be appreciated, the secure cookie 64 must be communicated in a secure manner to cache 50 for the above approach to provide a reliable confirmation that the non-secure cookie 63 has not been tampered with.

If the request from the client 10 is missing the non-secure cache cookie 63, then the server 40 will generate the response, providing a valid secure cookie 64 and non-secure cookie 63 to be used by the client 10 for future requests. If the request from the client 10 is missing a secure cookie 64, or the non-secure cookie 63 is determined to be invalid, then the data in the non-secure cache cookie 63 is ignored by the cache 50 and the response will be generated by the server 40. The server 40 will also serve the client 10 with a secure cookie 64 and a non-secure cookie 63 for use in subsequent requests. If the request does not include either cookie 63, 64, then the cache 50 will ignore the request and the server 40 will generate the response, together with cookies 63, 64 for use by the client 10 in future requests.

In the preferred embodiment, the non-secure cache cookies 62, 63 each contains a protect bit. If this bit is set, then the cookies 62, 63 will be transmitted only over a secure (SSL) channel, thus preventing theft of the cookies 62, 63. In the preferred embodiment, cookie 63 is intended for use as part of a request that flows over secure channel 14.

For cookie 62, the preferred embodiment system permits the cookie to flow over either an SSL channel or a non-SSL channel. If its protect bit is not set, then the cookie 62, may flow over a non-secure, unencrypted channel, which increases the risk that the cookie could be "stolen" by an unauthorized user and made the subject of a replay attack. However, even if the cookie 62 is stolen, the unauthorized user cannot manufacture a cookie which may be used to access cached data belonging to users other than the one assigned to that cookie 62.

Furthermore, the unauthorized user will not be able to use a stolen non-secure cookie 63 to access any data under SSL, as the system is configured to use the secure cache cookie 64 as a verifier for the non-secure cookie 63. The use of a hashed unique value or nonce in the secure cache cookie 64 prevents an unauthorized user from manufacturing a fraudulent secure cookie 64.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A computer-implemented method for a web-based system to provide data to a client from a data cache, the system comprising a server, the method comprising the following steps:
   a) the server generating a plurality of cookies comprising an encoded client identifier for the client, the encoded client identifier being generated using the HMAC protocol;
   b) the server delivering the plurality of cookies to the client;
   c) storing the data in the data cache in association with a cache key, the cache key for the data being generated in a manner dependent on the encoded client identifier;
   d) the data cache receiving a request directly from the client including a copy of the plurality of cookies from the client;
   e) the data cache retrieving the data from the data cache using the encoded client identifier provided in the copy of the plurality of cookies in the request; and
   f) the data cache delivering said data to the client.

2. The method of claim 1, in which the client identifier comprises a contract identifier and a parent organization identifier.

3. A computer-implemented method for a web-based system to provide data to a client from a data cache, the system comprising a server, the method comprising the following steps:
   a) the server generating a first state object comprising an encoded client identifier for the client;
   b) the server generating a second state object comprising a unique value and an encoded value, the encoded value being encoded using the unique value and the encoded client identifier;
   c) the server delivering the first state object to the client;
   d) the server delivering the second state object to the client using a secure connection;
   e) storing the data in the data cache in association with a cache key, the cache key for the data being generated in a manner dependent on the encoded client identifier;
   f) the server receiving a request from the client over a secure channel, the request including a copy of the first state object and a copy of the second state object;
   g) verifying the validity of the first state object by extracting the unique value and the encoded value from the received copy of the second state object, encoding said unique value from the received copy of the second state object and the encoded client identifier from the received copy of the first state object to produce a result, and comparing the result with the encoded value to verify the received copy of the first state object; and
   h) in the case that the validity of the first state object is verified, retrieving the data in the data cache using the encoded client identifier, and delivering the data to the authorized client.

4. The method of claim 3 in which the second state object is a cookie and the secure connection is an SSL connection.

5. The method of claim 3 in which the encoded client identifier, the encoded value, and the result are each encoded using the HMAC protocol.

6. The method of claim 5, in which the client identifier comprises a contract identifier and a parent organization identifier.

7. The method of claim 3 in which the unique value is a nonce comprising one of a monotonically varying set of data values.

8. The method of claim 4 in which the encoded client identifier, the encoded value, and the result are each encoded using the HMAC protocol.

9. The method of claim 8, in which the client identifier comprises a contract identifier and a parent organization identifier.

10. A computer program product comprising a computer usable medium tangibly embodying computer readable program code for implementation on a web server system, the computer readable program code means for carrying out the steps of the method as in any of the preceding claims.

* * * * *